Sept. 14, 1926.  
F. H. NASON  
1,599,620  
TACKLE HAULING VEHICLE  
Filed June 24, 1925
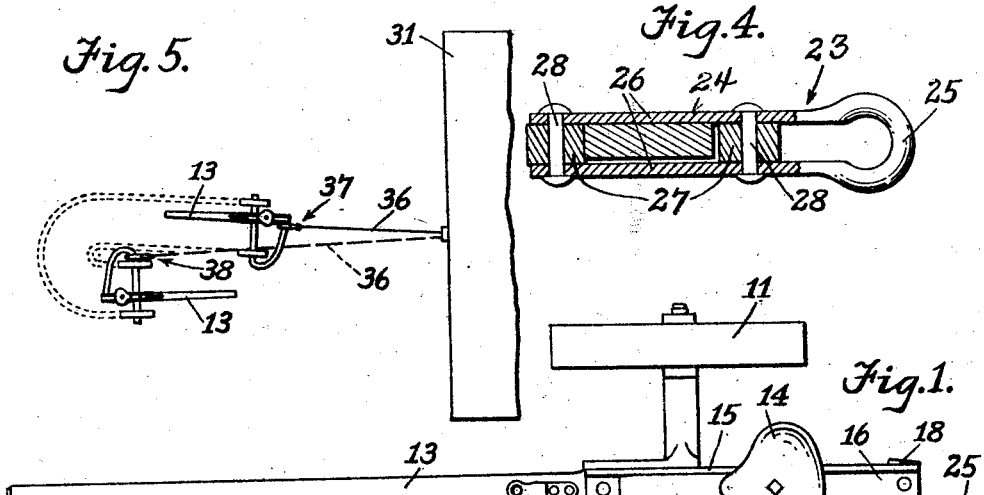
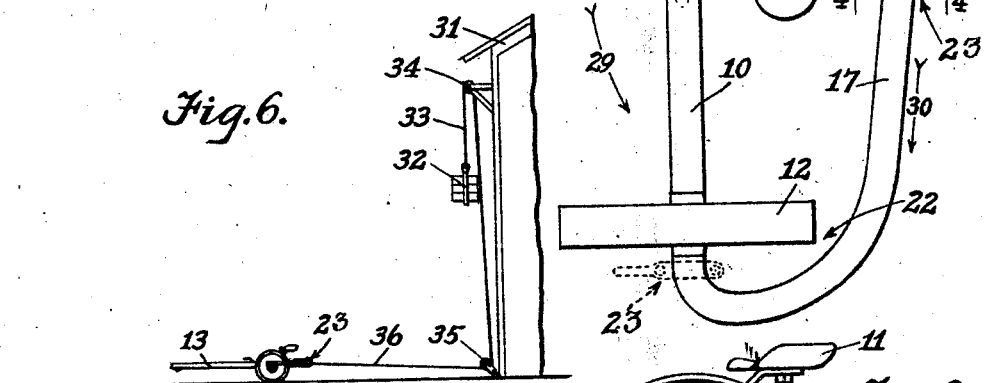
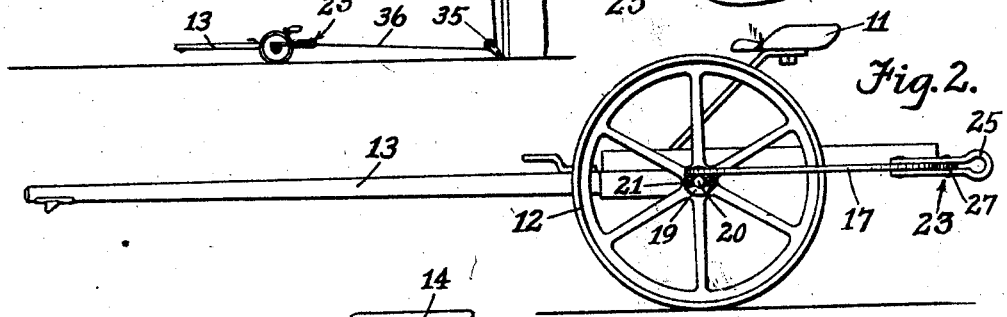
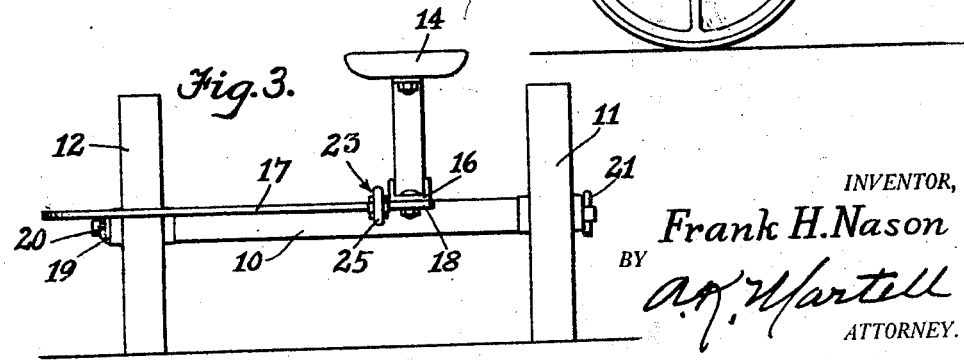
INVENTOR,  
Frank H. Nason  
BY  
A. K. Martell  
ATTORNEY.

Patented Sept. 14, 1926.

1,599,620

UNITED STATES PATENT OFFICE.

FRANK H. NASON, OF ALLIANCE, NEBRASKA.

TACKLE-HAULING VEHICLE.

Application filed June 24, 1925. Serial No. 39,235.

My invention relates to hoisting apparatus and more particularly to a device for use in connection with hoisting-tackle operated by horse power.

In operating hoisting tackle by horse power the common practice is to connect the hauling line or tackle-fall directly to the doubletree to which the horses are hitched and after each haul to back up the horses to the starting position. This backing-up process involves a relatively large amount of time and is difficult for the horses, often making them fretful and nervous, especially in the case of young and excitable horses.

The primary object of my invention is to provide a hauling vehicle equipped with a sliding clevis to which the tackle-fall may be attached, the clevis operating in such a manner that the horses hitched to the vehicle can proceed in a forward direction continuously, turning at the end of the hall, going ahead to the starting point and turning again into the hauling position.

Another object is to provide a device of the character described which is simple and inexpensive in construction and which will lend itself especially well to the operation of certan kinds of farm machinery, such as hay stackers, hay balers and the like and also to hoisting apparatus, pile drivers and similar machines in which hoisting tackle is used is connection with horse power.

Other objects and advantages will appear hereinafter and while I show herewith and will describe a preferred form of construction, I desire it to be understood that I do not limit my invention to such preferred form but that various changes and adaptations may be made therein without departing from the spirit of my invention as hereinafter claimed.

Referring to the drawings which accompany this specification and form a part thereof:

Fig. 1 is a plan view of my tackle hauling vehicle.

Fig. 2 is a side view of the tackle hauling vehicle shown in Fig. 1.

Fig. 3 is a rear vew of the tackle hauling vehicle shown in Figs. 1 and 2.

Fig. 4 is an enlarged sectional view of the sliding clevis and draw-bar of my tackle hauling vehicle, taken on line 4—4 of Fig. 1.

Fig. 5 is a diagrammatic plan view of a hoisting tackle attached to the side of a barn and my tackle hauling vehicle connected thereto, illustrating its use.

Fig. 6 is a similar diagrammatic view, in elevation, of the apparatus shown in Fig. 5.

As shown in the various figures the tackle hauling vehicle consists of an axle 10 with two wheels 11 and 12, a tongue 13 attached to the axle, preferably at one side of its middle point, and a driver's seat 14 mounted on the tongue or axle. These parts may be taken from a discarded mower or other piece of farm machinery often available for such use.

An extension bar 15, of suitable length and preferably of channel iron, is rigidly fixed at its forward end to the tongue and axle with its rear end 16 projecting rearwardly beyond the axle in alignment with the tongue. A horizontal draw-bar 17, with a straight end 18, fixed to the rear end 16 of bar 15, at a distance from the axle somewhat greater than the radius of the vehicle wheels, extends laterally from said bar 15 at oblique angles thereto and curves around and beyond the further wheel 12 of the vehicle terminating against the outer end of its hub as shown in Fig. 1.

At this point the draw-bar 17 has a right angled bend which forms a downwardly projecting lug 19 in which an aperture is made to receive the spindle pin 20 upon which it is held by a cotter pin 21 or a nut. It is thus securely held in a horizontal position, inclined somewhat toward the end of the axle to which it is attached, a clearance space 22 being left between it and the outer face of the wheel 12.

A clevis 23 adapted to slide from end to end of draw-bar 17 is mounted thereon, said clevis consisting of a metal strap 24 bent in the middle to form a loop 25, to which the tackle is attached, the ends or legs 26 thereof straddling draw-bar 17. Rollers 27 adapted to engage the edges of draw bar 17, are fitted between legs 26 and turnably held therebetween by rivets 28 extending through the rollers and said legs.

The length of the rollers is slightly greater than the thickness of draw-bar 17 and they are so spaced in the clevis that ample clearance is provided for free sliding action of the latter on the draw-bar.

The operation of my tackle hauling vehicle is indicated in Fig. 1 and is more fully illustrated in Figs. 5 and 6. The tackle-fall is attached to loop 25 of the clevis, which is shown in its hauling position in Fig. 1. At the end of the haul the vehicle is turned in the direction indicated by arrow 29 and as the turn is made the clevis slides along draw-bar 17 as indicated by arrow 30, assuming the position indicated in dotted lines when the turn is completed. It is understood that the weight of the fork, when used with a hay stacker, or the grappling hooks, when used with a hoisting tackle, is sufficient to keep the tackle-fall taut at all times.

Figs. 5 and 6 illustrate the use of my tackle hauling vehicle when applied to a hoisting tackle for elevating baled hay and the like into an upper story of a barn or storehouse 31. Grappling hooks or a sling 32 is attached to one end of a rope or cable 33 which is rove over an upper pulley 34 and around a sheave in a snatch block 35 near the ground. The tackle-fall 36 is fastened to the clevis 23, which is maintained in the position shown at 37 during the haul, the turn being made as indicated by the dotted lines in Fig. 5 and the tackle-fall and clevis assuming the positions shown at 38 during the return trip to the starting point. It is evident that during the haul the clevis maintains a position approximately midway between the wheels and that the relatively slight pull due to the weight of the sling or grappling hooks, on the clevis during the return trip, which tends to draw the vehicle forward, is easily resisted by the holding back of the horses. It is also evident that the offset of the tongue from the center of the vehicle provides ample space for a horse between the tackle-fall and the tongue during the return trip, so that horses are not disturbed by too close a proximity to the tackle-fall.

Having thus illustrated and described my invention, I claim.

1. A tackle hauling vehicle, for use with hoisting tackle operated by horse power, comprising a two-wheeled vehicle having a tongue, an extension-bar projecting rearwardly in alignment with said tongue, an arcuate draw-bar secured to said extension-bar so as to extend laterally therefrom around the rear of one of said vehicle wheels to the center of the outer side thereof, and a sliding clevis mounted on said draw-bar, there being a clearance provided between said draw-bar and the outer face of said vehicle wheel to permit said clevis to be continuously held in an operative position while the vehicle is advancing or returning, or is making a turn at either end of its travel.

2. In combination with a two-wheeled vehicle, an arcuate draw-bar attached to the rear of said vehicle in spaced relation to the axle thereof, one end of said draw-bar curving around the rear of one wheel of said vehicle and fastening to the spindle-pin adjacent the outer end of its hub, and a clevis slidably mounted on said draw-bar so that in traveling from end to end thereof it moves from a rearwardly extending position midway between the vehicle wheels to a forwardly extending position at one side of the vehicle or vice versa, when the direction of the vehicle is reversed, there being a clearance between said draw-bar and the outer face of said wheel sufficient to receive said clevis.

FRANK H. NASON.